United States Patent [19]
Takano et al.

[11] Patent Number: 5,926,947
[45] Date of Patent: Jul. 27, 1999

[54] RUBBER PLUG FITTING APPARATUS

[75] Inventors: Yukinori Takano; Mitsuru Yoshikawa; Akira Sugiyama, all of Shizuoka, Japan

[73] Assignee: Yazaki Corporation, Tokyo, Japan

[21] Appl. No.: 08/810,939

[22] Filed: Feb. 27, 1997

[30] Foreign Application Priority Data

Mar. 1, 1996 [JP] Japan ..................................... 8-045133
Jun. 7, 1996 [JP] Japan ..................................... 8-146013

[51] Int. Cl.⁶ .................................................. B23P 19/04
[52] U.S. Cl. ............................... 29/754; 29/450; 29/785; 29/235; 29/790; 29/809; 29/881
[58] Field of Search .............................. 29/450, 789, 790, 29/525, 754, 235, 809, 785, 881

[56] References Cited

U.S. PATENT DOCUMENTS

| | | | |
|---|---|---|---|
| 4,059,889 | 11/1977 | Randolph et al. | 29/809 |
| 4,653,182 | 3/1987 | Fukuda et al. | 29/809 |
| 5,007,164 | 4/1991 | Kato | 29/450 |
| 5,016,346 | 5/1991 | Gerst et al. | 29/809 |
| 5,351,385 | 10/1994 | Takano | 29/450 |
| 5,432,996 | 7/1995 | Imgrut et al. | 29/754 |
| 5,743,002 | 4/1998 | Ito et al. | 29/450 |

FOREIGN PATENT DOCUMENTS 64-9131  2/1989  Japan .

*Primary Examiner*—P. W. Echols
*Attorney, Agent, or Firm*—Armstrong, Westerman, Hattori, McLeland and Naughton

[57] ABSTRACT

The rubber plug fitting apparatus includes a temporary receiver (4) disposed after the feeder (3); a rubber plug holder (5) pivotable 90 degrees by a first drive means (29); a transfer pin (7) for transferring the rubber plug (2) to the holder (5); a wire guide (11) disposed opposite the holder (5) when the latter is pivoted 90 degrees with the rubber plug held therein, which supports a wire (9); a second drive means (37) for moving the holder in a rubber plug fitting direction; and a third drive means (36) for moving the guide (11) in the same direction. A waterproofing rubber plug is reliably fitted over a wire with high positional accuracy.

7 Claims, 12 Drawing Sheets

FIG. 3
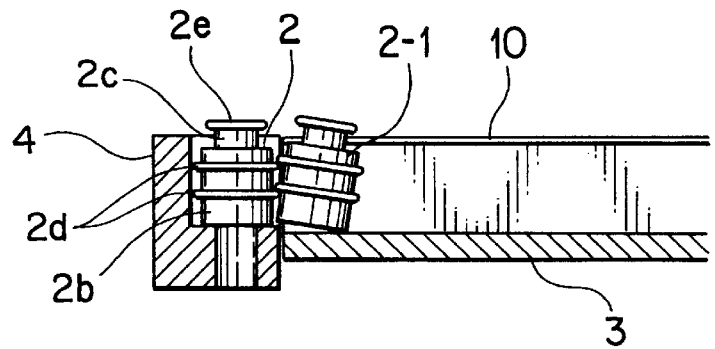
FIG. 4A    FIG. 4B
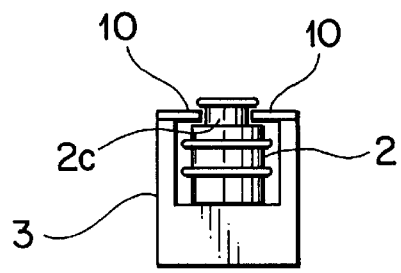   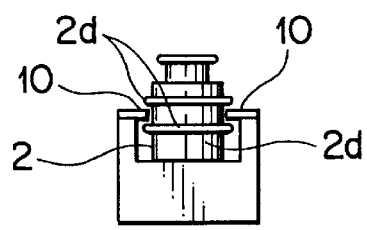
FIG. 5
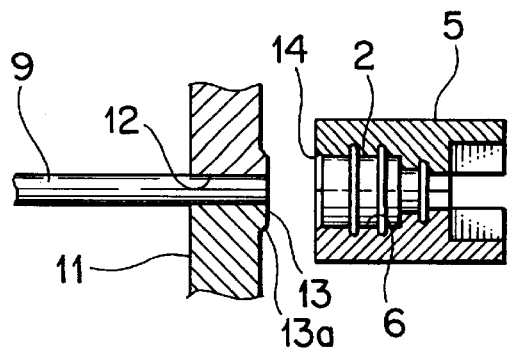

FIG. 23A
PRIOR ART
FIG. 23B
PRIOR ART
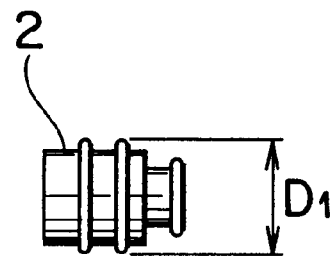
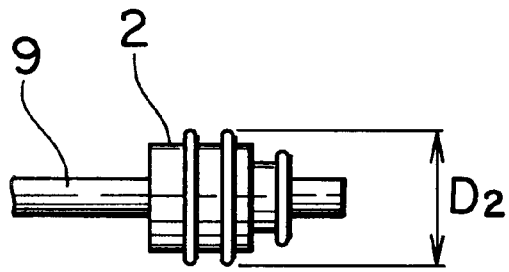
FIG. 24
PRIOR ART
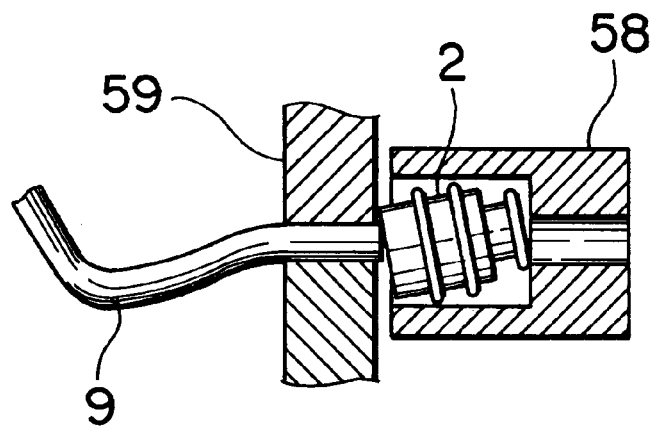

RUBBER PLUG FITTING APPARATUS

BACKGROUND OF THE INVENTION

1. Field of the Invention

The present invention relates to an apparatus for automatically fitting over the end of a wire a water-proofing rubber plug that is to be installed in a terminal accommodating chamber of a connector housing. This invention also relates to a method of supplying the rubber plug from a feeder of the rubber plug fitting apparatus to a rubber plug holding portion, and to a method of fitting the rubber plug reliably.

2. Description of the Related Art

FIGS. 17 and 18 show one example of a conventional rubber plug fitting apparatus (Japanese Patent Publication No. 64-9131). This apparatus includes a clamp 44 for holding a wire 43, a guide 45 for guiding the front part of the wire 43, and a rubber plug holder 48 for holding a rubber plug 46 in a groove 47. The rubber plug 46 is installed in a terminal accommodating chamber of a connector housing not shown to prevent ingress of water into the chamber.

The clamp 44 and the guide 45 have at their front ends a V-shaped recess 49 and a projection 50. A front part 43a of the wire 43 protrudes from the guide 45. The rubber plug holder 48 is formed at its side with the groove 47, in which the rubber plug 46 is installed with one half exposed and protruding. The guide 45 is provided with a cover 51 that guides the protruding side of the rubber plug 46. The rubber plug 46 is supplied from a feeder not shown to the rubber plug holder 48.

The rubber plug holder 48, as shown in FIG. 18, is advanced by an air cylinder not shown to insert the front part of the wire 43 into an inner hole 46a of the rubber plug 46 until the wire protrudes a specified length from the rubber plug 46. The front part 43a of the wire is stripped of insulation in the next process and then crimped with a terminal.

FIGS. 19 and 20 show one example of a rubber plug supply section of the conventional rubber plug fitting apparatus. The following description may not strictly correspond to the above example. The rubber plug supply section 53 is intended to feed rubber plugs 2 to the rubber plug holder. Disposed opposite the front of a feeder 54 is a laterally movable temporary receiver 55, which receives and holds a rubber plug 2 in its groove 56 and is moved laterally to feed the rubber plug 2 sideways of the feeder 54. Then, as shown in FIG. 20, the rubber plug 2 is pushed out of the temporary receiver 55 into a holder 58 by a transfer pin 57. If the temporary receiver 55 is not provided, when the rubber plug 2 is pushed out of the feeder 54, the succeeding rubber plugs 2-1 easily fall blocking the smooth feeding.

FIG. 21 shows the rubber plug holder 58 being moved toward a wire guide 59. In this example, the wire guide 59 can be moved backward along the wire 9. The holder 58 pushes the guide 59 backward to insert the front part 9a of the wire 9 into the rubber plug 2.

FIG. 22 shows an example in which the inner diameter of the groove 60 of the rubber plug holder 58 is set larger than the outer diameter of the rubber plug 2. This is based on the fact that when the wire 9 is inserted into the rubber plug 2 as shown in FIGS. 23A and 23B, the outer diameter of the rubber plug 2 increases from D1 to D2. If the groove diameter is set equal to the rubber plug diameter as in the case of FIG. 21, the wire insertion causes the rubber plug 2 to get stuck to the groove, resulting in the plug being dislocated or shifted.

With the above conventional rubber plug fitting apparatus, however, there is a problem that the sideways feeding by the temporary receiver 55 as shown in FIG. 19 makes the equipment large and complex. Further, when the rubber plug holder 58 is moved toward the wire guide 59 as shown in FIG. 21, any slight deviation of their centers will result in the wire 9 failing to be inserted into the rubber plug 2.

Another problem is that if the diameter D3 of the groove 60 of the rubber plug holder 58 is set larger than the outer diameter D1 of the rubber plug 2 as shown in FIG. 23a, the rubber plug 2 is unstable because of plays in the groove as shown in FIG. 24, so that even if the rubber plug holder 58 and the wire guide 59 are aligned in center, the front end of the wire 9 would abut against the rubber plug 2 and get buckled resulting in an insertion failure, especially when the rubber plug has a large insertion resistance.

Similarly, because the guide 59 is slidable longitudinally of the wire, a clearance is produced between the guide and the wire, which may cause the wire to buckle in an initial phase of the rubber plug fitting process.

Further, because the fitting stroke of the rubber plug 2 is defined by the air cylinder, the apparatus cannot deal with a situation where the fitting stroke is changed when a different kind of rubber plug is used. Even in the same size, the rubber plugs produce different fitting resistances according to the size of wire. This means that because the plug, after fitting, is returned from the set stroke by an amount corresponding to the fitting resistance, the final fitting position of the plug will vary.

SUMMARY OF THE INVENTION

In light of the above-mentioned drawbacks, it is an object of this invention to provide a rubber plug fitting means, which prevents increases in size and complexity of the apparatus, as has been caused by the temporary receiver's sideways feeding of the plug; which eliminates such problems as center deviations between the plug holder and the wire guide and sticking of a rubber plug in the holder during wire insertion and thereby ensures reliable insertion of wire into the rubber plug; which allows the fitting stroke to be changed according to the rubber plug size; and which eliminates the fitting position variations caused by the spring-back action of the rubber plug after wire insertion.

To achieve the object, according to an aspect of this invention, there is provided a rubber plug fitting apparatus comprising: a feeder for feeding rubber plugs; a rubber plug temporary receiver disposed opposite an end of the feeder; a rubber plug holder disposed above the rubber plug temporary receiver and pivotable 90 degrees by a first drive means; a vertically movable transfer pin for transferring the rubber plug from the rubber plug temporary receiver to the rubber plug holder; a wire guide disposed opposite the rubber plug holder when the holder is pivoted 90 degrees with the rubber plug held therein, which supports a wire; a second drive means for moving the rubber plug holder in a direction in which the rubber plug is fitted to the wire; and a third drive means for moving the wire guide in the rubber plug fitting direction.

Preferably, the second drive means comprises a servo motor. The feeder is provided with a flange-shaped guide portion for guiding neck portions of the rubber plugs. The rubber plug holder and the wire guide are formed with socket-and-spigot engagement portions for centering a rubber plug slot of the rubber plug holder and a wire insertion hole of the wire guide. Further, preferably, the rubber plug holder comprises a pair of split half members, wherein an inner diameter of the opposed rubber plug slots of the paired split half members is set equal to an outer diameter of the rubber plug, and a pressure for a chuck cylinder that opens and closes the split half members is reduced during rubber plug fitting in order to expand the diameter of the slots as the rubber plug bulges in diameter.

According to another aspect of this invention, there is provided a rubber plug fitting apparatus comprising: a vertically movable slide block having a rubber plug temporary receiver disposed opposite an end of a rubber plug feeder; a base block disposed below the slide block and movable up and down by a cylinder; a spring member elastically installed between the base block and the slide block; a transfer pin secured to the base block and having an insertion tip adapted to enter into an inner hole of a rubber plug held in the rubber plug temporary receiver; a stopper situated above the slide block for limiting the up-movement of the slide block; and a rubber plug holder situated above the transfer pin.

According to a further aspect of this invention, there is provided a method of supplying a rubber plug from a rubber plug feeder to a rubber plug holder by using the above-mentioned rubber plug fitting apparatus, comprising the steps of: feeding a rubber plug from the feeder to the rubber plug temporary receiver; moving up the base block and the slide block together; and when the rubber plug in the rubber plug temporary receiver comes close to the rubber plug holder, moving up the base block and thus the transfer pin to transfer the rubber plug into the rubber plug holder.

According to yet a further aspect of this invention, there is provided a rubber plug fitting method comprising: gripping a wire with front and rear clamps such that a front end of the wire projects slightly from the front clamp; moving one of a rubber plug and the both clamps to insert the front end of the wire into an inner hole of the rubber plug in a first step insertion action; and opening the front clamp and moving one of the rubber plug and the rear clamp to fully insert the wire into the inner hole of the rubber plug in a second step insertion action.

The basic operation of the rubber plug fitting apparatus is described below.

A rubber plug is transferred from the feeder to the temporary receiver. Then, the transfer pin is moved up to transfer the rubber plug from the temporary receiver to the holder. The holder is closed by the chuck cylinder to firmly hold the rubber plug without a play and is pivoted 90 degrees by the first drive means. Next, the holder is advanced by the second drive means and at the same time the wire guide is retracted by the third drive means to allow the rubber plug to be fitted over the front part of the wire projecting from the wire guide (in other words, the front end of the wire is inserted into the rubber plug).

To supply a rubber plug, the base block and the transfer pin as well as the slide block are moved up as one unit by the cylinder. When the slide block abuts against and is stopped by the stopper, the base block and the pin continue to move up until the insertion tip of the transfer pin enters into the rubber plug held in the temporary receiver and transfers it from the temporary receiver up into the holder.

The above and other objects, features and advantages of this invention will become apparent from the following description and the appended claims, taken in conjunction with the accompanying drawings in which like parts or elements are denoted by like reference characters.

BRIEF DESCRIPTION OF THE DRAWINGS

FIG. 3 is a vertical cross section showing the temporary receiver in the rubber plug supply section about to be lifted;

FIG. 4A is a side view showing the feeder guiding a neck portion of the rubber plug;

FIG. 4B is a side view showing the feeder guiding an intermediate portion of the rubber plug;

FIG. 5 is a cross section showing the rubber plug holder and the wire guide about to be connected like a socket-and-spigot joint;

FIG. 23A is a plan view of a rubber plug;

FIG. 23B is a plan view of the rubber plug fitted over a wire; and

FIG. 24 is a cross section showing a fitting failure.

DESCRIPTION OF THE PREFERRED EMBODIMENTS

Now, preferred embodiments of this invention will be described in detail with reference to the accompanying drawings.

Figure 1:
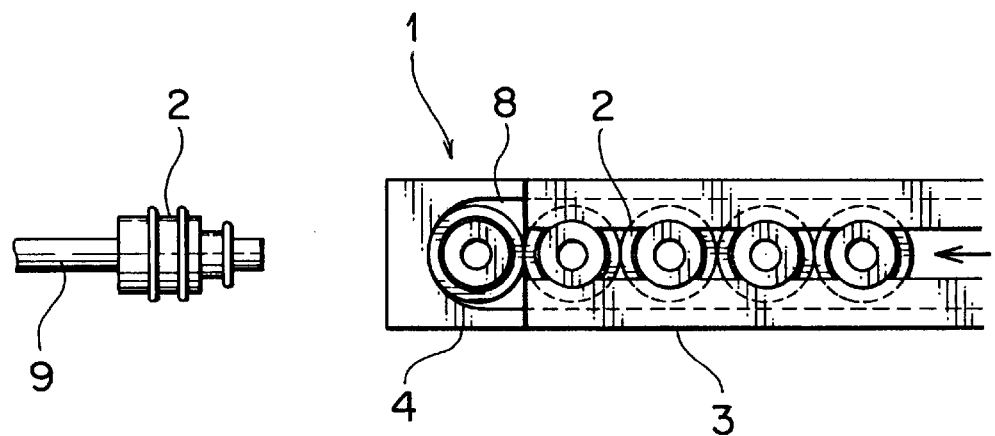
FIG. 1 is a plan view showing the outline of the rubber plug supply section in the rubber plug fitting apparatus of this invention.
Figure 2:
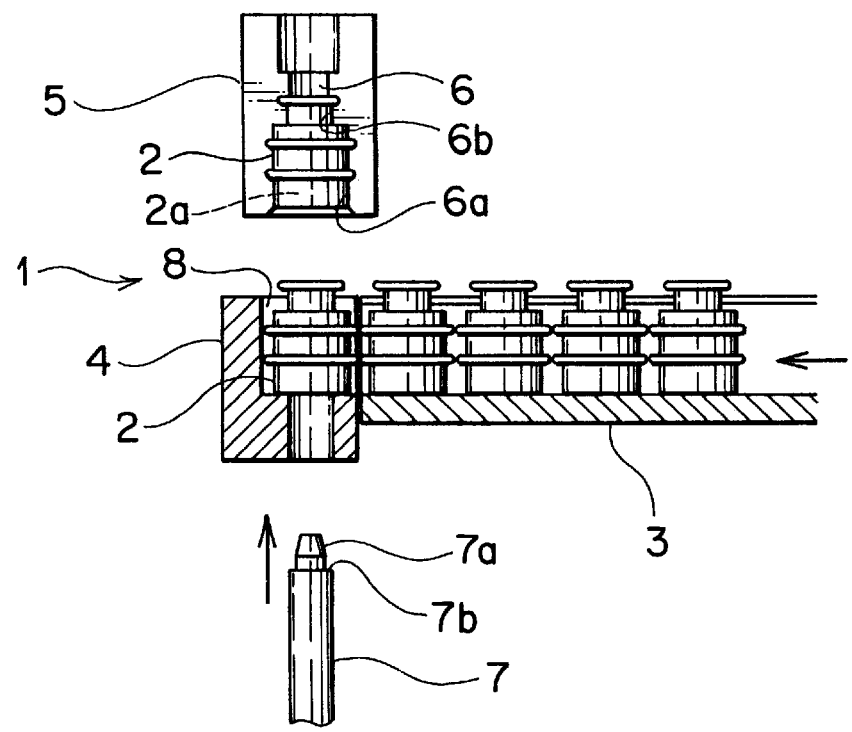
FIG. 2 is a vertical cross section showing the outline of the rubber plug supply section.

FIGS. 1 and 2 show the outline of a rubber plug supply section in the rubber plug fitting apparatus of this invention. The overall configuration of the rubber plug fitting apparatus will be detailed later.

The rubber plug supply section 1 includes a straight feeder 3 shaped like a trough that feeds a plurality of waterproofing rubber plugs 2 in an erect state; a temporary receiver (rubber plug guide) 4 situated opposite the end of the straight feeder 3 and moved vertically by a drive mechanism not shown; a rubber plug holder 5 situated above and facing the temporary receiver 4; and a transfer pin 7 that is vertically driven to push up the rubber plug 2 from the temporary receiver 4 into a slot 6 in the rubber plug holder 5.

The temporary receiver 4 has a rubber plug receiving recess 8 extending vertically therethrough. The transfer pin 7 has a large-diameter step portion 7b below a tapered front end portion 7a. The front end portion 7a advances into an inner hole 2a of the rubber plug 2 and the large-diameter step portion 7b supports and transfers the rubber plug 2 to the holder 5. The rubber plug holder 5 has the slot 6 which consists of a large-diameter portion 6a and a small-diameter portion 6b, conforming to the shape of the rubber plug 2. The rubber plug holder 5 is rotated 90 degrees by a drive mechanism described later so that, as shown in FIG. 1, the rubber plug 2 can be fitted over the front end part of the horizontally held wire 9. The temporary receiver 4 does not have a laterally horizontally moving escape mechanism, as does the conventional apparatus, thus preventing the apparatus from becoming large in size.

The temporary receiver 4 can be moved vertically, as shown in FIG. 3, so that the rubber plug 2 is lifted toward the rubber plug holder 5. As shown in FIGS. 3 and 4A, the feeder 3 has at its upper end a pair of guide plates 10 that guide a neck portion 2c of the rubber plug 2 (a small-diameter portion between a top flange portion 2e and an intermediate, sealing annular lip 2d which is securely crimped by a terminal onto the wire 9). When the annular lips 2d on the outer circumference of the rubber plug 2 mounted on the temporary receiver 4 contact and tilt the next rubber plug 2-1 as the rubber plug on the temporary receiver 4 is lifted, guide plates 10 automatically correct the attitude of the tilted plug 2-1. If the guide plates 10 guide a large-diameter portion 2b of the rubber plug 2 between the upper and lower annular lips 2d, as shown in FIG. 4B, the upper annular lip 2d may get stuck between the guide plates 10, blocking the automatic attitude correction of the tilted rubber plug 2.

FIG. 5 shows the rubber plug holder 5 about to be a forced against the wire guide 11 to fit the rubber plug 2 held in the rubber plug holder 5 over the wire 9. The wire guide 11 and the rubber plug holder 5 are centered by the socket-and-spigot engagement. That is, the wire guide 11 is formed with an annular, tapered, raised portion 13 at the edge of a wire insertion hole 12. The rubber plug holder 5 has an annular tapered guide surface 14 on the open side of the slot 6 that is adapted to engage a taper surface 13a of the raised portion 13. The engagement between the annular, tapered, raised portion 13 and the tapered guide surface 14 forces the center of the slot 6 and the center of the wire insertion hole 12 to align with each other, assuring a reliable rubber plug fitting. The parts 13 and 14 form the socket-and-spigot engagement portion.

Figure 6:
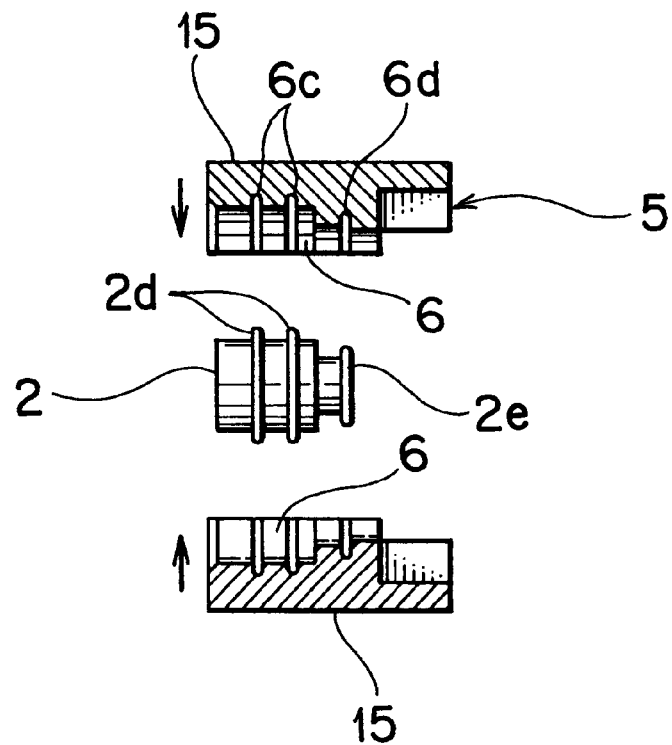
FIG. 6 is a cross section of a rubber plug holder of a split type.
Figure 7:
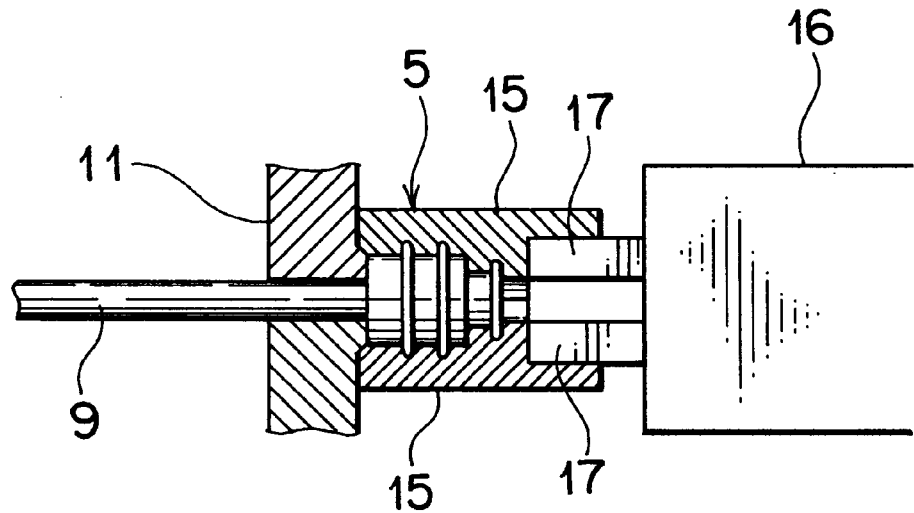
FIG. 7 is a cross section of a chuck cylinder closing the rubber plug.

FIGS. 6 and 7 show the rubber plug holder. The rubber plug holder 5 is split into a pair of left and right halves 15, 15 as shown in FIG. 6. The left and right halves 15 are formed with symmetric slots 6. The inner diameter of the slot 6 is set equal to the outer diameter of the rubber plug 2 so that the rubber plug 2 can be held firmly without a play in a pair of slots 6, 6. The slots 6 have annular grooves 6c, 6d corresponding to the annular lips 2d and the flange portion 2e of the rubber plug 2.

As shown in FIG. 7, a pair of split halves 15 are mounted on a pair of chucks 17, 17 of a chuck cylinder 16, and the open-close operation of the chucks 17 causes the split halves 15 to open or close. The gripping force (pressure) of the chuck cylinder 16 is reduced during wire insertion. When the wire 9 is inserted into the rubber plug 2 held in the rubber plug holder 5, the chucks 17 expand outwardly together with the split halves 15 as the rubber plug 2 bulges. This reduces the insertion resistance of the wire 9, allowing smooth insertion. After the wire is inserted, the split halves 15 are opened together with the chucks 17 to release the rubber plug 2. These operations ensure that the rubber plug 2 is easily and reliably separated from the holder 5 and prevent dislocation or shifting of the rubber plug 2.

Figure 8:
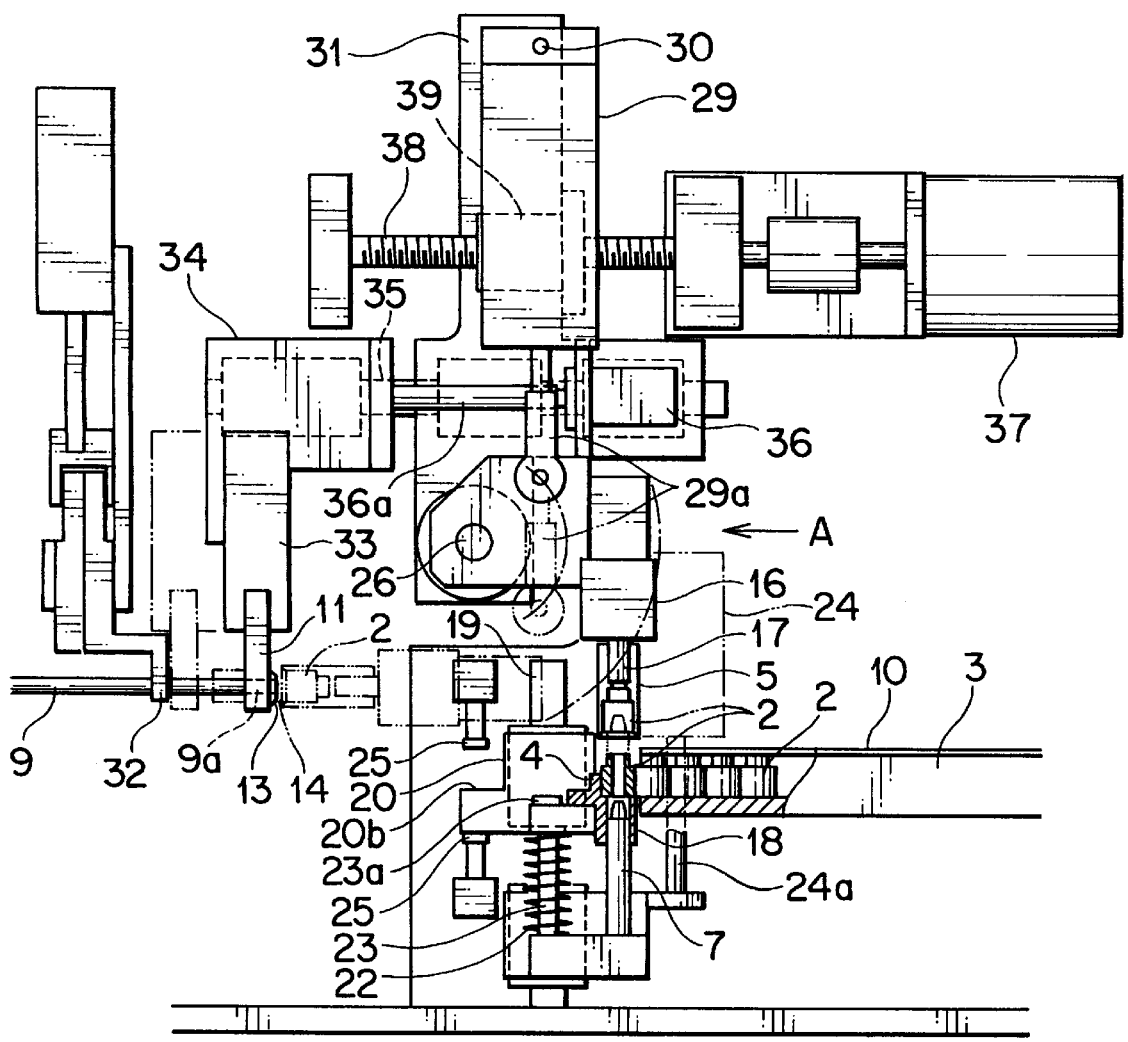
FIG. 8 is a partly cutaway front view showing a detailed structure of the rubber plug fitting apparatus.
Figure 10:
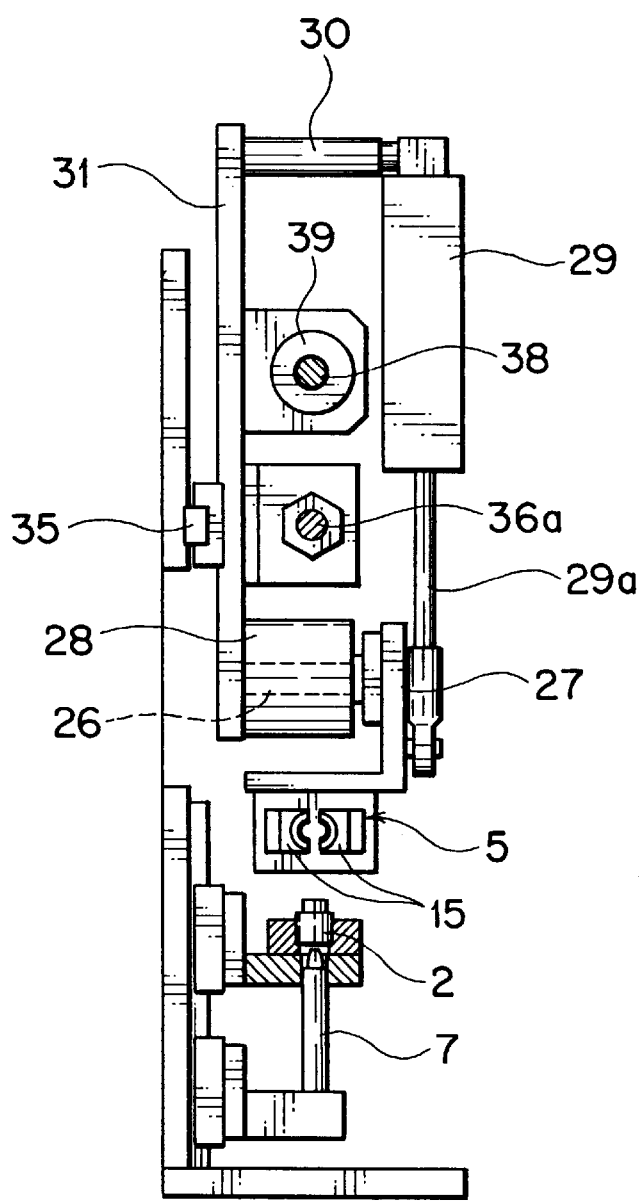
FIG. 10 is a side view of the rubber plug fitting apparatus.
Figure 9:
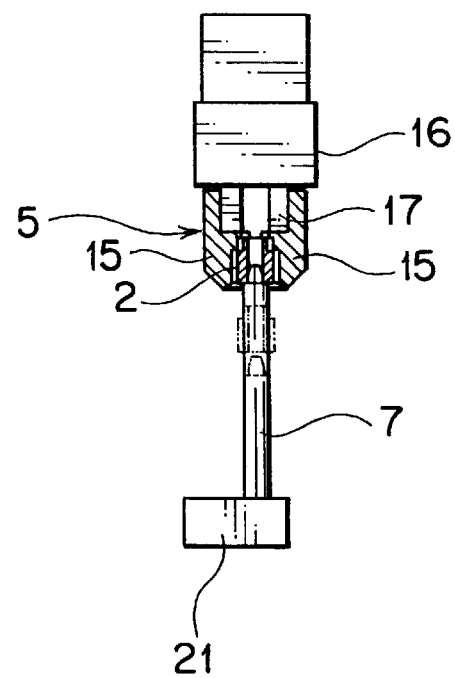
FIG. 9 is a side view as seen from the arrow A of FIG. 8, showing how the rubber plug is handed over from the holder.

FIGS. 8 to 10 show details of the rubber plug fitting apparatus having the mechanisms described above. In FIG. 8, denoted 3 is a straight feeder, 2 a rubber plug, 4 a temporary receiver, 7 a transfer pin, and 5 a rubber plug holder.

The temporary receiver 4 is formed to about half the height of the rubber plug 2 and has a guide portion 18 on its underside for guiding the transfer pin. The temporary receiver 4 is secured to a slide block 20 that can be moved along a vertical rail 19. The vertical rail 19 is slidably mounted with a base block 21 that has the transfer pin 7 fixed thereto (FIG. 9). A coil spring 22 is installed between the slide block 20 and the base block 21, the latter two being connected by a slide pin 23. The slide pin 23 has its lower end fixed to the base block 21, and a stopper 23a at the top of the slide pin 23 has its underside engage a part of the slide block 20. The base block 21 is connected to a rod 24a of an inverted type vertical cylinder 24. Stoppers 25, 25 are disposed above and below a protruding portion 20b of the slide block 20.

The rubber plug 2 is supplied from the straight feeder 3 onto the temporary receiver 4. The contracting action of the vertical cylinder 24 causes the transfer pin 7 together with the temporary receiver 4 to move up. When the protruding portion 20b of the slide block 20 abuts against the upper stopper 25, the pin 7 continues to move up against the force of the spring to transfer the rubber plug 2 from the temporary receiver 4 onto the holder 5. The extending action of the vertical cylinder 24 lowers, through the stopper 23a, the slide block 20 or the temporary receiver 4 together with the transfer pin 7.

As shown in FIGS. 8 and 9, the rubber plug holder 5 holds the rubber plug 2 facing downward and is pivoted about a shaft 26 to a horizontal position as shown in FIG. 10. A pair of split halves 15, 15 of the holder 5 are formed almost in half cylinders and secured to the chuck 17 of the inverted chuck cylinder 16 (FIG. 8). The chuck cylinder 16 is secured to an L-shaped bracket 27, which in turn is connected to the shaft 26. The shaft 26 is supported by a bearing 28 (FIG. 10). To the upper end of the bracket 27 is connected a rod 29a of an inverted type oscillation cylinder 29 (first drive means).

The oscillation cylinder 29 is supported on a vertical base plate 31 by a horizontal pin 30, about which the oscillation cylinder 29 can be oscillated. The bearing 28 is secured to the vertical base plate 31. As the oscillation cylinder 29 extends, the rubber plug holder 5 pivots together with the bracket 27 to a position opposed to the wire guide 11 that supports the horizontal wire 9. The wire guide 11 and the rubber plug holder 5 have the socket-and-spigot engagement portions 13, 14 for centering.

Behind the wire guide 11 is situated a wire chuck 32. The wire guide 11 is connected to a chuck cylinder 33, which in turn is slidably mounted on a horizontal rail 35 through a block 34 and driven horizontally by a rod 36a of a horizontal cylinder 36 (third drive means). The horizontal cylinder 36 is secured to the vertical base plate 31, which is driven in the horizontal direction (the direction in which the rubber plug is fitted) by a servo motor 37 (second drive means). That is, the vertical base plate 31 is secured to a nut portion 39 screwed over a threaded shaft 38 driven by the servo motor 37. The drive action of the servo motor 37 causes the rubber plug holder 5 along with the vertical base plate 31 to advance and at the same time the wire guide 11 is retracted by the horizontal cylinder 36 to allow the front part 9a of the wire projecting from the wire guide 11 to be inserted into the rubber plug 2.

The use of the servo motor 37 enables the distance of fitting to be set according to the wire size. Further, variations in the fitting position can be prevented by correcting beforehand by the servo motor 37 the spring back that occurs after fitting because of a large fitting resistance. This correction is achieved by fitting the rubber plug 2 over a stroke of the predetermined fitting distance plus α and returning the plug to the correct fitting position by the servo motor 37.

Figure 11:
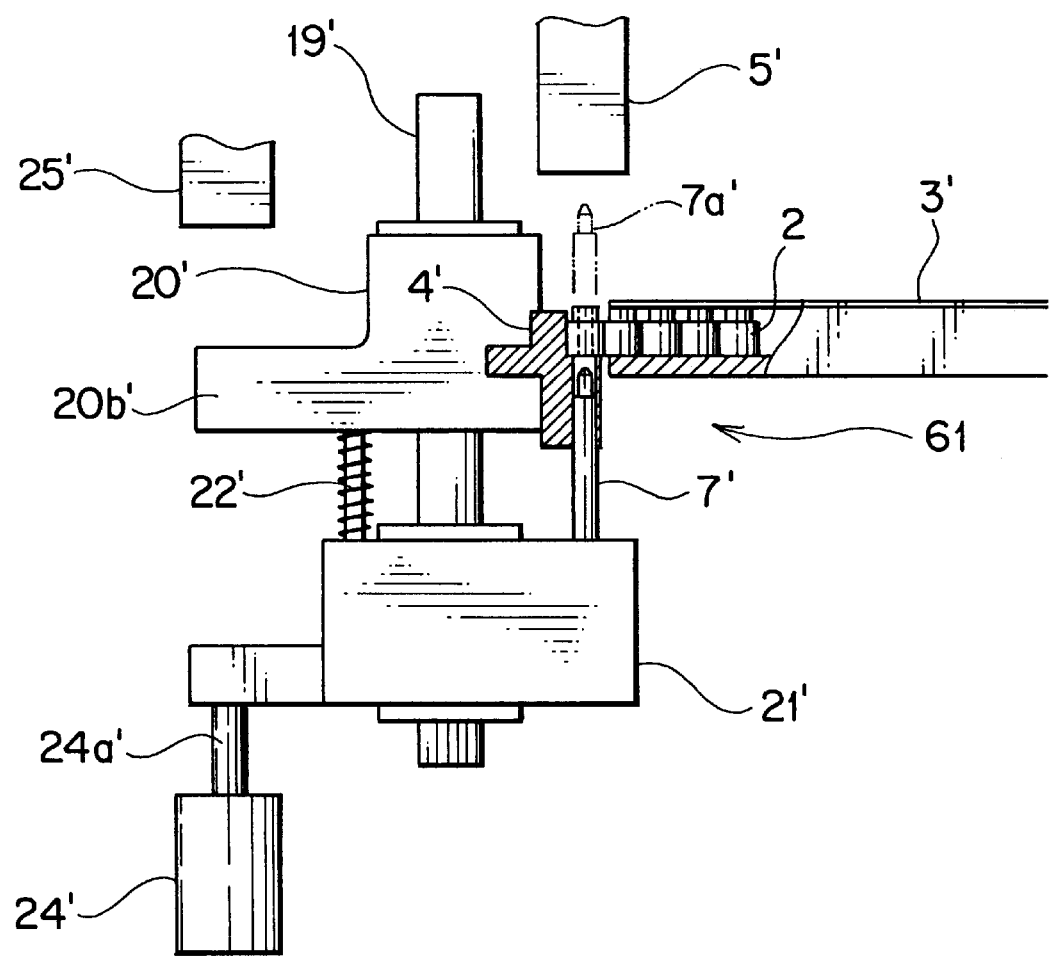
FIG. 11 is a front view showing the rubber plug supply means in the rubber plug fitting apparatus.

FIG. 11 shows a variation of a means (rubber plug supply section 61) for supplying rubber plugs 2 from the straight feeder 3 of FIG. 8 onto the rubber plug holder 5. In FIG. 11, reference number 3' represents a straight feeder, 4' a rubber plug temporary receiver (rubber plug guide) for receiving a rubber plug from the straight feeder 3', 7' a transfer pin for pushing up the rubber plug 2 from the temporary receiver, and 5' a rubber plug holder for receiving a rubber plug 2 from the transfer pin 7'.

The transfer pin 7' has at its front end an insertion tip 7a' slightly smaller in diameter than the inner hole of the rubber plug 2. The transfer pin 7' is secured to a base block 21', which is driven by a pneumatic vertical cylinder 24' to travel up or down a vertical rail 19'. The temporary receiver 4' is secured to a slide block 20' disposed above the base block 21'. The slide block 20' and the base block 21' are connected by a coil spring 22'. Above the slide block 20' is provided a stopper 25' facing it.

As shown in FIG. 11, with a rod 24a' of the vertical cylinder 24' contracted, the insertion tip 7a' of the transfer pin 7' is situated below the rubber plug 2 held in the temporary receiver 4'. As the rod 24a' extends, the base block 21' rises together with the slide block 20' with the rubber plug 2 held in the temporary receiver 4'. When after having risen to some extent, a horizontal projection 20b' of the slide block 20' abuts against the stopper 25', stopping the slide block 20'. The base block 21' continues to move up together with the transfer pin 7' compressing the coil spring 22' until the insertion tip 7a' of the transfer pin 7' enters into the inner hole of the rubber plug 2, lifting it from the temporary receiver 4' and transferring it to the rubber plug holder 5'. The rubber plug holder 5' grips the rubber plug 2 with chucks as shown in FIG. 8.

Figure 12:
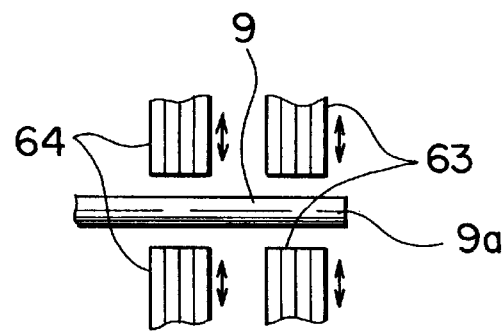
FIG. 12 is a plan view showing a first phase of the rubber plug fitting process (clamp is open)
Figure 13:
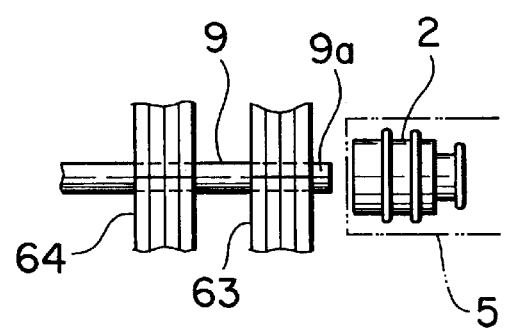
FIG. 13 is a plan view showing a second phase of the rubber plug fitting process (wire is clamped)

FIGS. 12 to 16 show one embodiment of the method of fitting a rubber plug according to this invention. The first step of this method is to grip the wire 9 with two longitudinally arranged pairs of wire clamps 63, 64, as shown in FIG. 12, so that the front end 9a of the wire 9 projects slightly from the front wire clamps 63 as shown in FIG. 13. The rear wire clamps 64 are spaced from the front end 9a of the wire 9 by more than the fitting stroke of the rubber plug 2. The front wire clamps 63 correspond to the wire guide 11 of the rubber plug fitting apparatus of FIG. 8 and the rear wire clamps 64 to the chuck 32. The front and rear wire clamps 63, 64 can be operated independently. These clamps 63, 64 firmly hold the wire 9.

Figure 14:
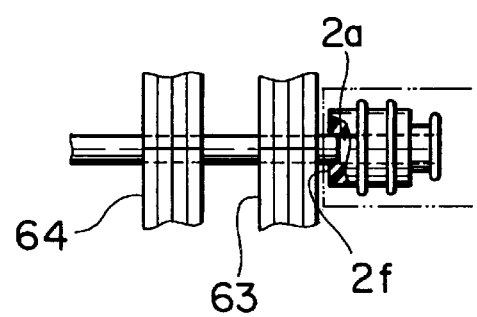
FIG. 14 is a plan view showing a third phase of the rubber plug fitting process (rubber plug is fitted to a preliminary position)

With the wire gripped as shown in FIG. 13, the rubber plug 2 is advanced toward the front end 9a of the wire 9. The advancement of the rubber plug 2 is accomplished, for example, by rotating the servo motor 37 and the threaded shaft 38 to move the rubber plug holder 5 forwardly with the rubber plug 2 held in the rubber plug holder 5 in FIG. 8. The rubber plug 2 is advanced to insert the front end 9a of the wire 9 into the inner hole 2a of the rubber plug 2 by about 2 mm as shown in FIG. 14. This is a preliminary fitting step. In this state, the front wire clamps 63 are opened to reach positions outside the rubber plug 2 (in more precise terms, the rubber plug holder 5). The open-close operation of the front clamps 63 corresponds to the operation of the chuck cylinder 33 of FIG. 8.

Figure 16:
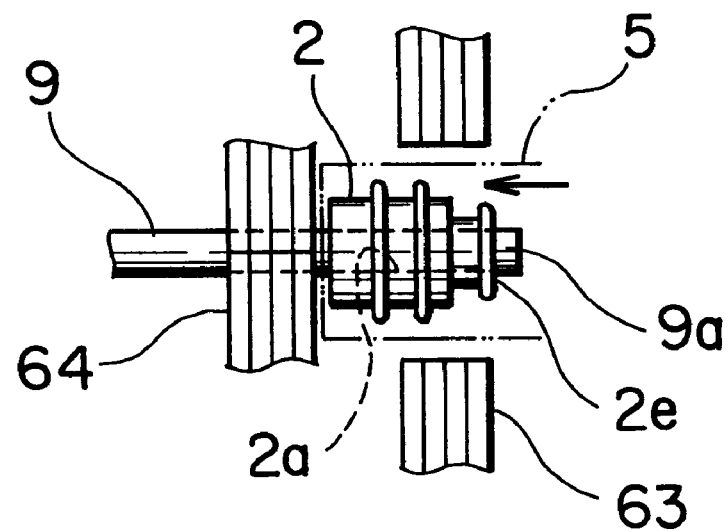
FIG. 16 is a plan view showing a fifth phase of the rubber plug fitting process (rubber plug is fitted to a second position)
Figure 17:
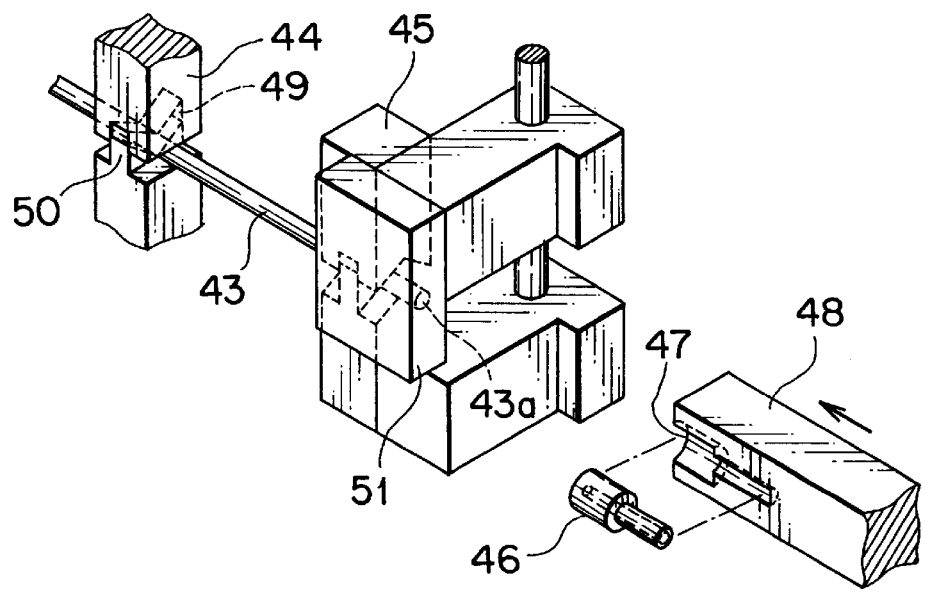
FIG. 17 is a perspective view showing an essential part of an example of a conventional rubber plug fitting apparatus.
Figure 18:
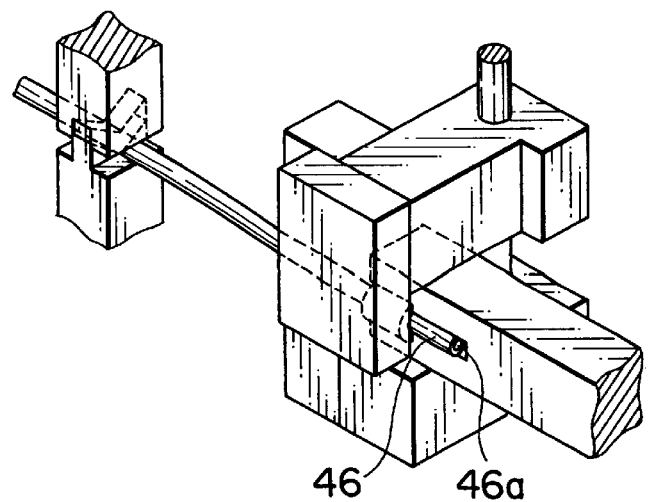
FIG. 18 is a perspective view showing a rubber plug in a fitted state (the state in which a wire is inserted into the rubber plug)
Figure 19:
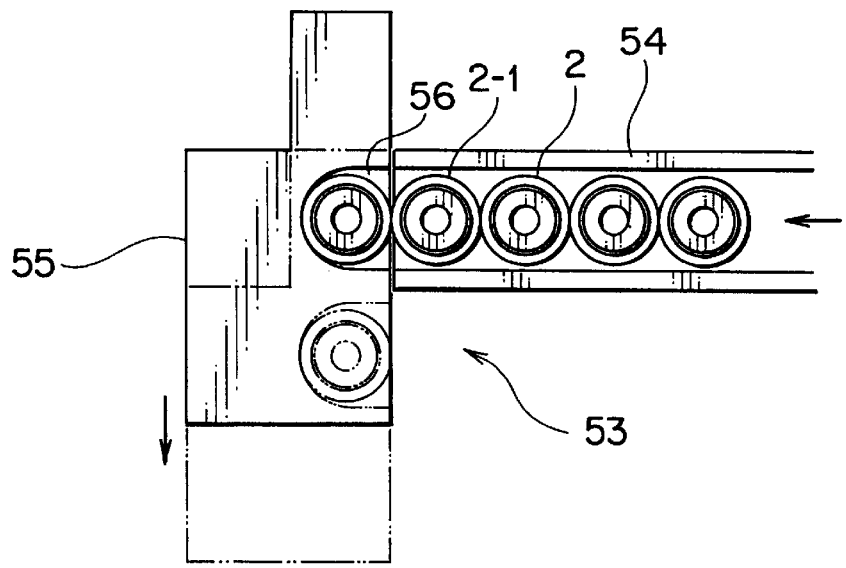
FIG. 19 is a plan view showing the outline of a conventional rubber plug supply section.
Figure 20:
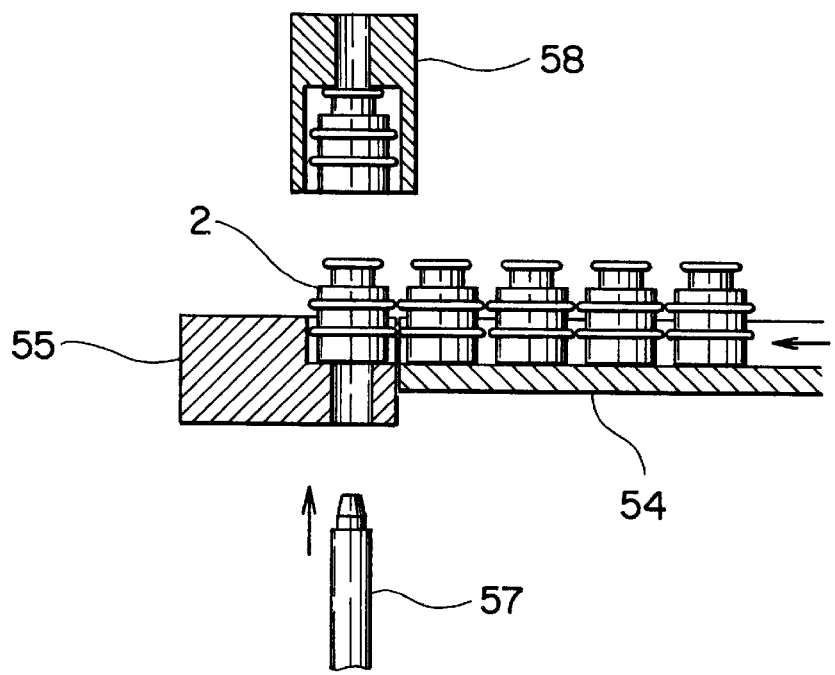
FIG. 20 is a vertical cross section showing the outline of the conventional rubber plug supply section.
Figure 21:
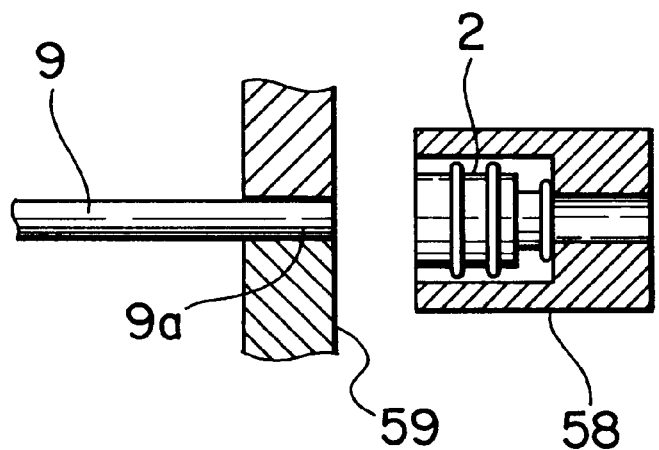
FIG. 21 is a cross section showing a rubber plug holder and a wire guide in the conventional apparatus.
Figure 22:
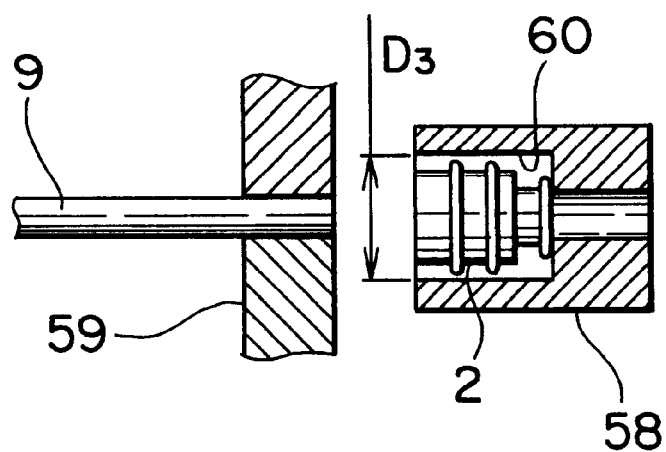
FIG. 22 is a cross section of a rubber plug holder whose inner diameter is set larger than the outer diameter of the rubber plug.

Then, the rubber plug 2 (strictly speaking, the rubber plug holder 5) is further advanced to insert the wire 9 into the inner hole 2a of the rubber plug 2 until the front end 9a of the wire 9 projects slightly from the rear end 2e of the rubber plug 2, as shown in FIG. 16. This is a second fitting step. Finally, the rear clamps 64 are also opened. Now, a wire complete with a rubber plug is obtained. The opening of the rear clamps 64 corresponds to the opening operation of the chuck 32 of FIG. 8.

Figure 15:
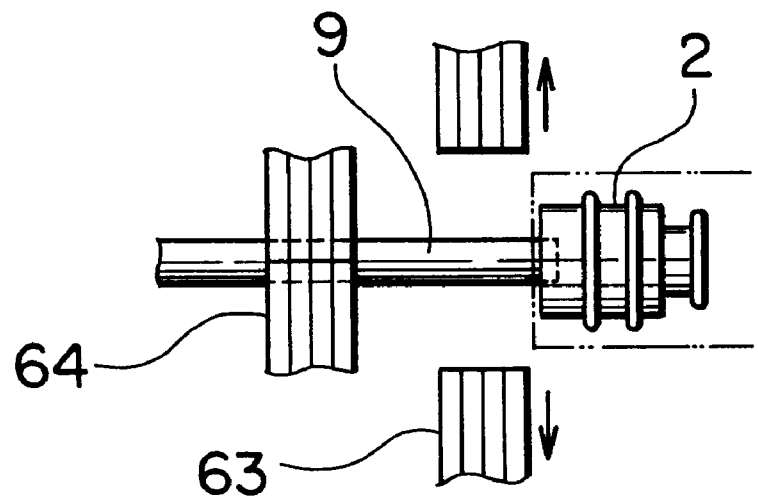
FIG. 15 is a plan view showing a fourth phase of the rubber plug fitting process (front clamp is open)

The plug fitting process, as explained above, consists of two steps: first fitting the front end 2f side of the rubber plug 2 over the front end 9a of the wire 9 with the wire 9 firmly held immovable as shown in FIG. 14 and then opening the front clamps 63 as shown in FIG. 15 to allow the rubber plug 2 to be fully advanced along the wire 9 to a desired position as shown in FIG. 16. Because the front clamps 63 firmly grip the wire 9, the wire 9 can be inserted reliably into the rubber plug 2 without buckling during the first fitting step.

Rather than moving the rubber plug 2, it is also possible to move the front and rear clamps 63, 64 together. This may be realized by contracting the horizontal cylinder 36 in FIG. 8 to advance the wire guide 11 on the front side and at the same time operating other mechanism not shown to advance the chuck 32 on the rear side along with the wire guide 11.

The advantages of this invention may be summarized as follows.

Because the distance that the rubber plug holder is to be advanced can be freely adjusted by a servo motor, the rubber plug fitting apparatus of this invention can deal with a variety of kinds of rubber plugs. Further, because the rubber plug after fitting is returned to a desired position by the servo motor to correct the spring back action of the plug, the position accuracy of the rubber plug is improved, enhancing the reliability of waterproofing. The neck portion of the plug is guided by the feeder, so that the rubber plug, if inclined, is prevented from falling and automatically restored to the original attitude. This eliminates the need for the lateral escape action of the conventional temporary receiver, reducing the installation space and simplifying the construction of the apparatus. The socket-and-spigot engagement between the rubber plug holder and the wire guide centers the rubber plug and the wire, assuring reliable fitting of the rubber plug. Further, because the rubber plug holder comprises a pair of split half members to firmly grip a rubber plug, dislocation of the plug from the holder or faulty fitting due to excessive play between the plug and the holder can be prevented.

The rubber plug supply means reliably supplies a plurality of rubber plugs from the feeder to the rubber plug holder one plug at a time. Furthermore, because the rubber plug is fitted in two steps, the rubber plug can be reliably fitted over the front end of a wire in the first step, preventing wire buckling and the resulting rubber plug fitting failure which are experienced with the conventional apparatus.

Having now fully described the invention, it will be apparent to one of ordinary skill in the art that many changes and modifications can be made thereto without departing from the spirit and scope of the invention as set forth herein.

What is claimed is:

1. A rubber plug fitting apparatus comprising:

a feeder for feeding rubber plugs;

a vertically movable rubber plug temporary receiver disposed opposite an end of said feeder;

a rubber plug holder disposed above said vertically movable rubber plug temporary receiver and pivotable 90 degrees by a first drive means;

a vertically movable transfer pin for transferring said rubber plug from said vertically movable rubber plug temporary receiver to said rubber plug holder;

a wire guide for supporting a wire disposed opposite said rubber plug holder when said holder is pivoted 90 degrees with said rubber plug held therein;

a second drive means for moving said rubber plug holder in a direction in which said rubber plug is fitted to said wire; and a third drive means for moving said wire guide in said rubber plug fitting direction.

2. The rubber plug fitting apparatus according to claim 1, wherein said second drive means comprises a servo motor.

3. The rubber plug fitting apparatus according to claim 2, wherein said servo motor has a threaded shaft which, when rotated, moves said rubber plug holder in said rubber plug fitting direction.

4. The rubber plug fitting apparatus according to claim 1, wherein said feeder is provided with a flange-shaped guide portion for guiding neck portions of said rubber plugs.

5. The rubber plug fitting apparatus according to claim 1, wherein said rubber plug holder and said wire guide are provided with socket-and-spigot engagement portions for centering a rubber plug slot of said rubber plug holder and a wire insertion hole of said wire guide.

6. The rubber plug fitting apparatus according to claim 5, wherein said socket-and spigot engagement portions comprise corresponding taper surfaces formed on said rubber plug holder and said wire guide.

7. The rubber plug fitting apparatus according to claim 1, wherein said rubber plug holder comprises a pair of split half members, and wherein an inner diameter of opposed rubber plug slots of said paired split half members is set equal to an outer diameter of said rubber plug, and a pressure for a chuck cylinder that opens and closes said split half members is reduced during rubber plug fitting in order to expand the diameter of said slots as said rubber plug bulges in diameter.

\* \* \* \* \*